Figure 1A:
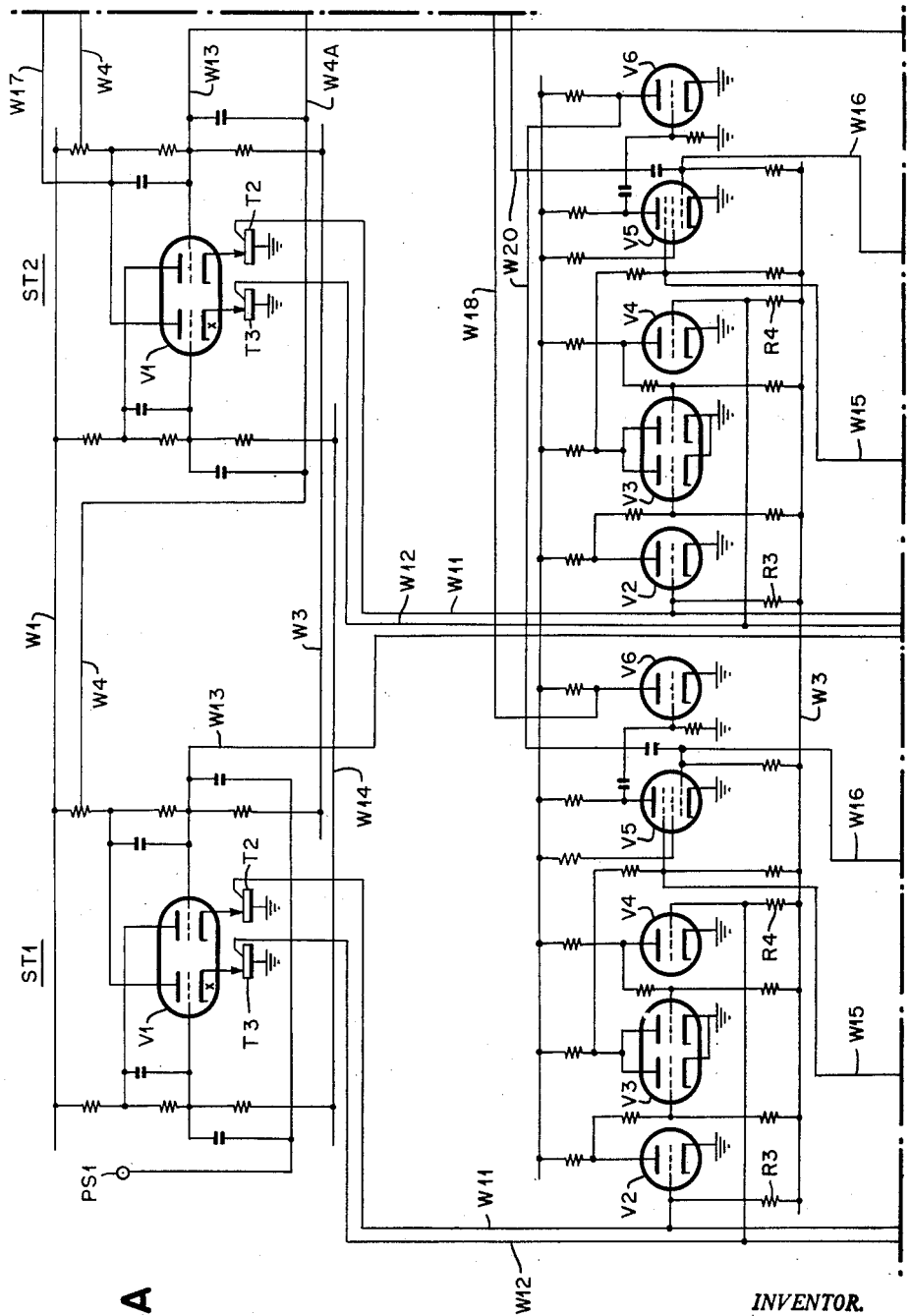

Jan. 26, 1960

A. H. DICKINSON 2,922,983

DATA PROCESSING MACHINE

Filed Dec. 31, 1954

10 Sheets-Sheet 1

INVENTOR.
ARTHUR H. DICKINSON

BY

ATTORNEY

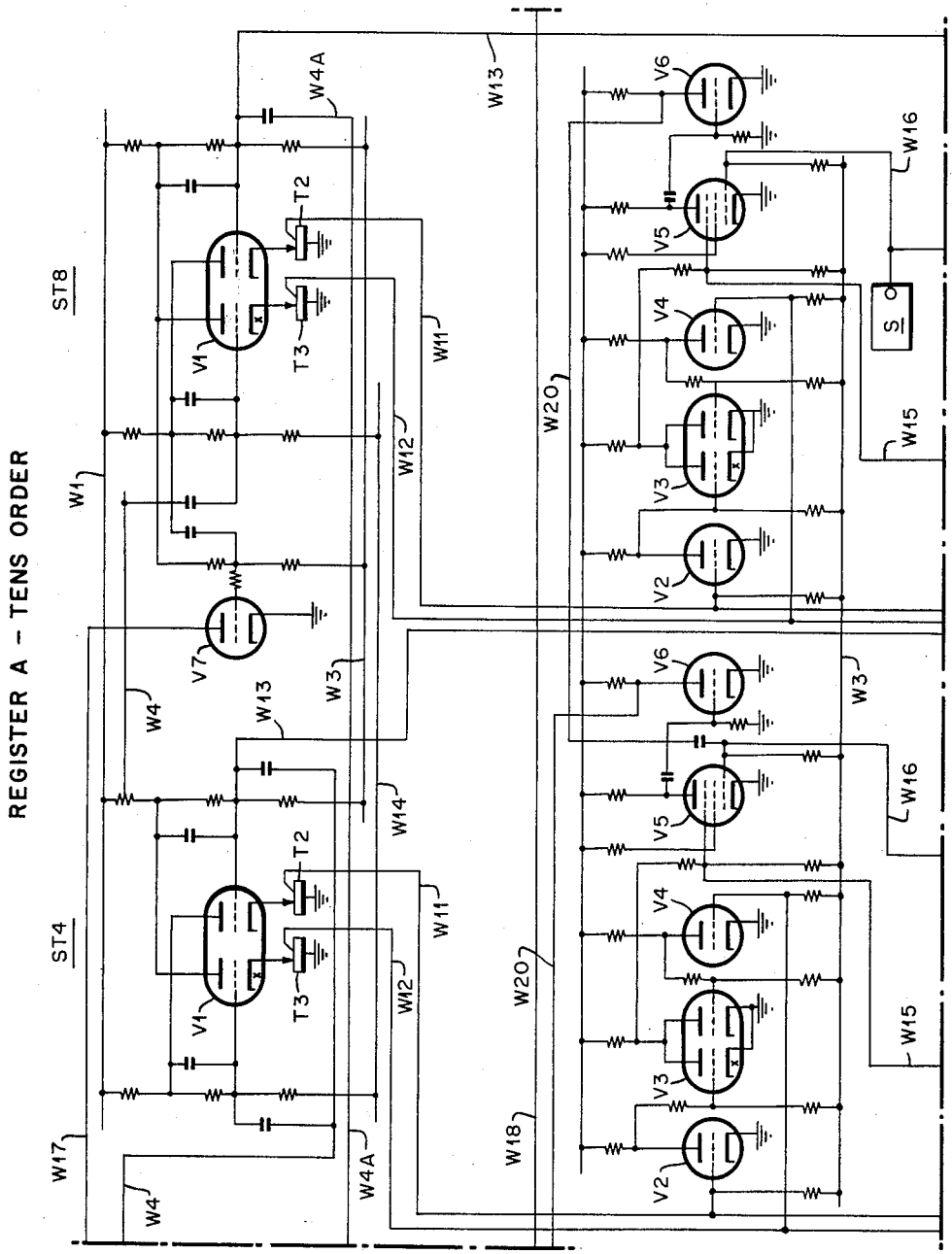

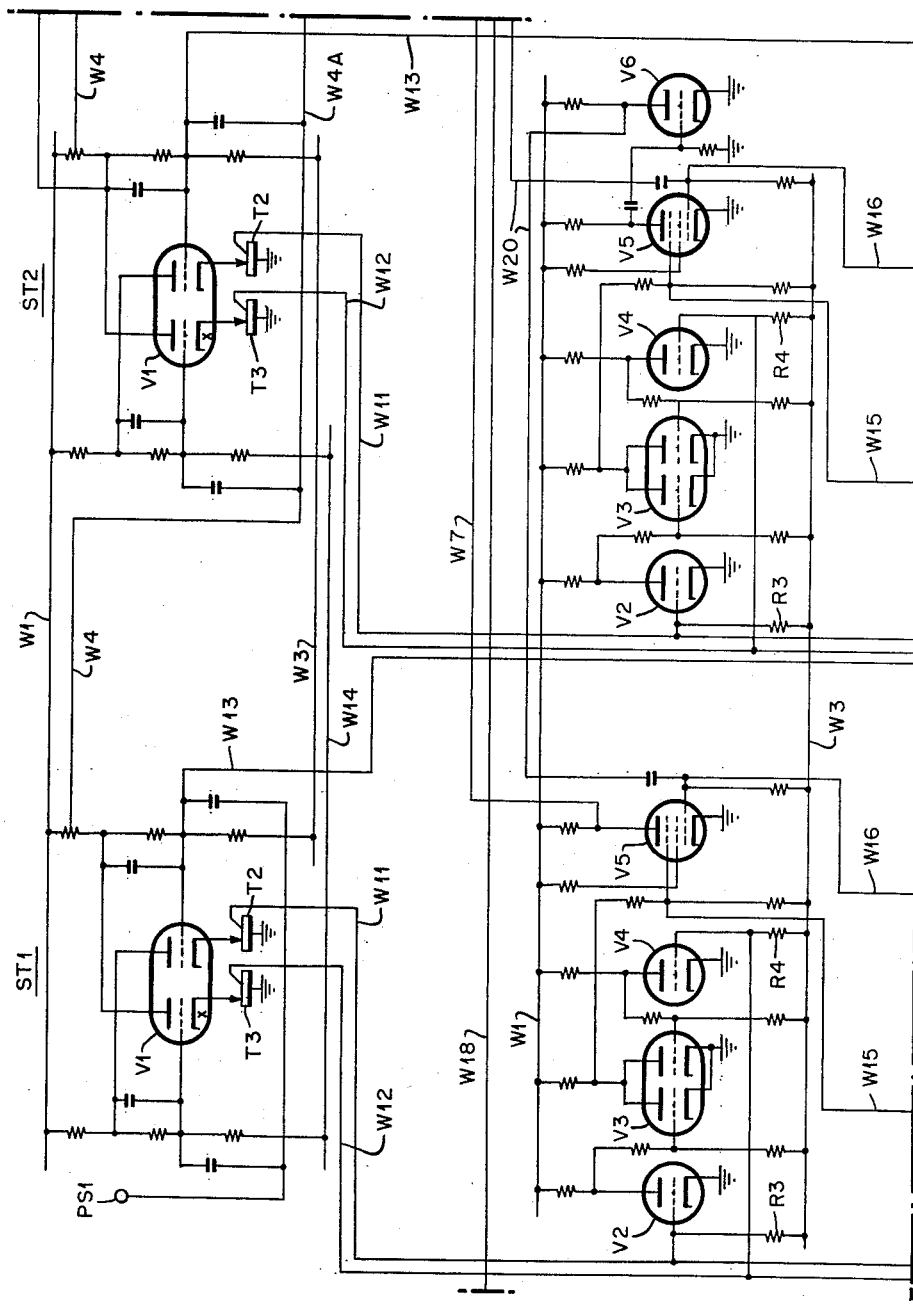

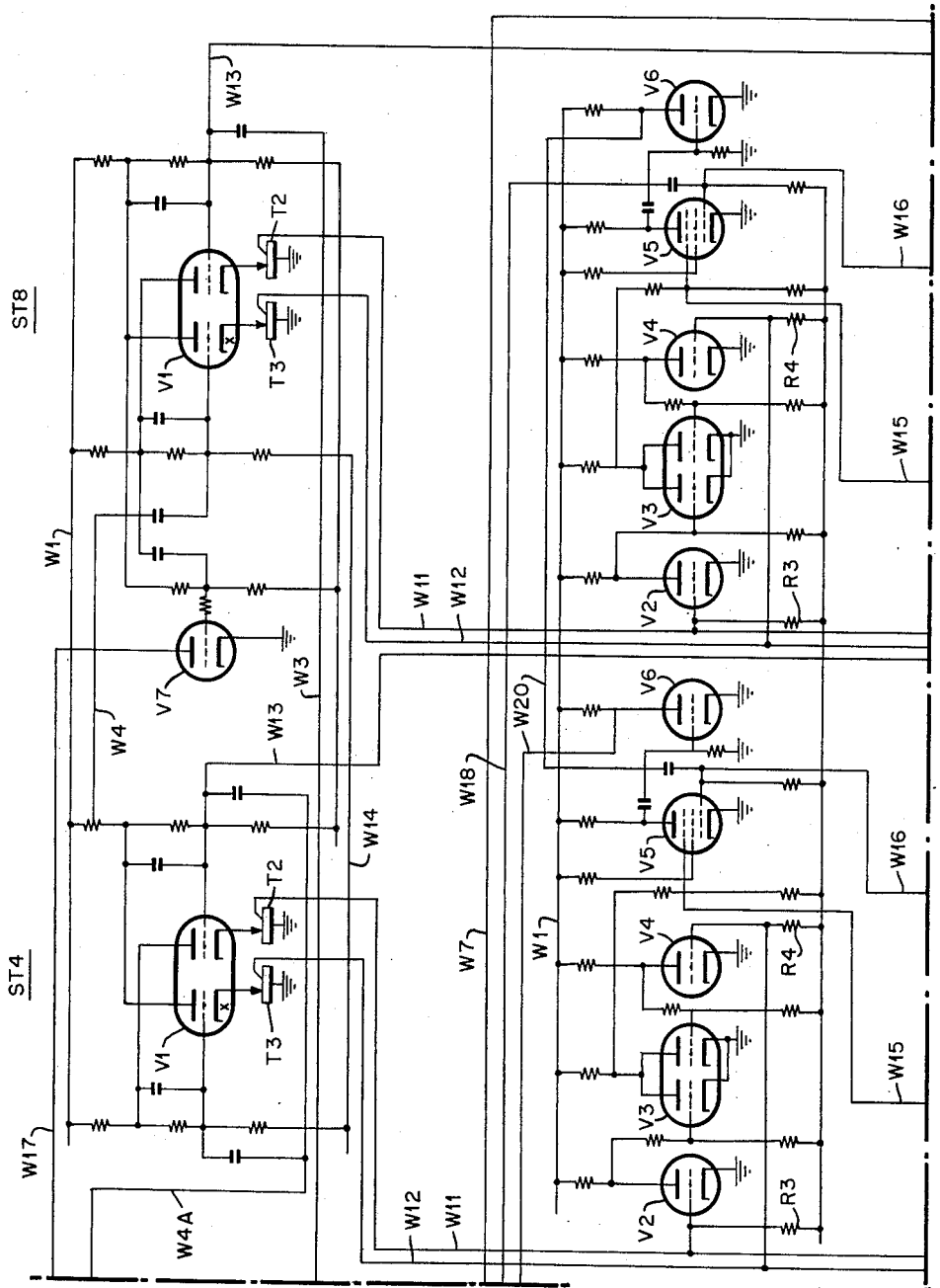

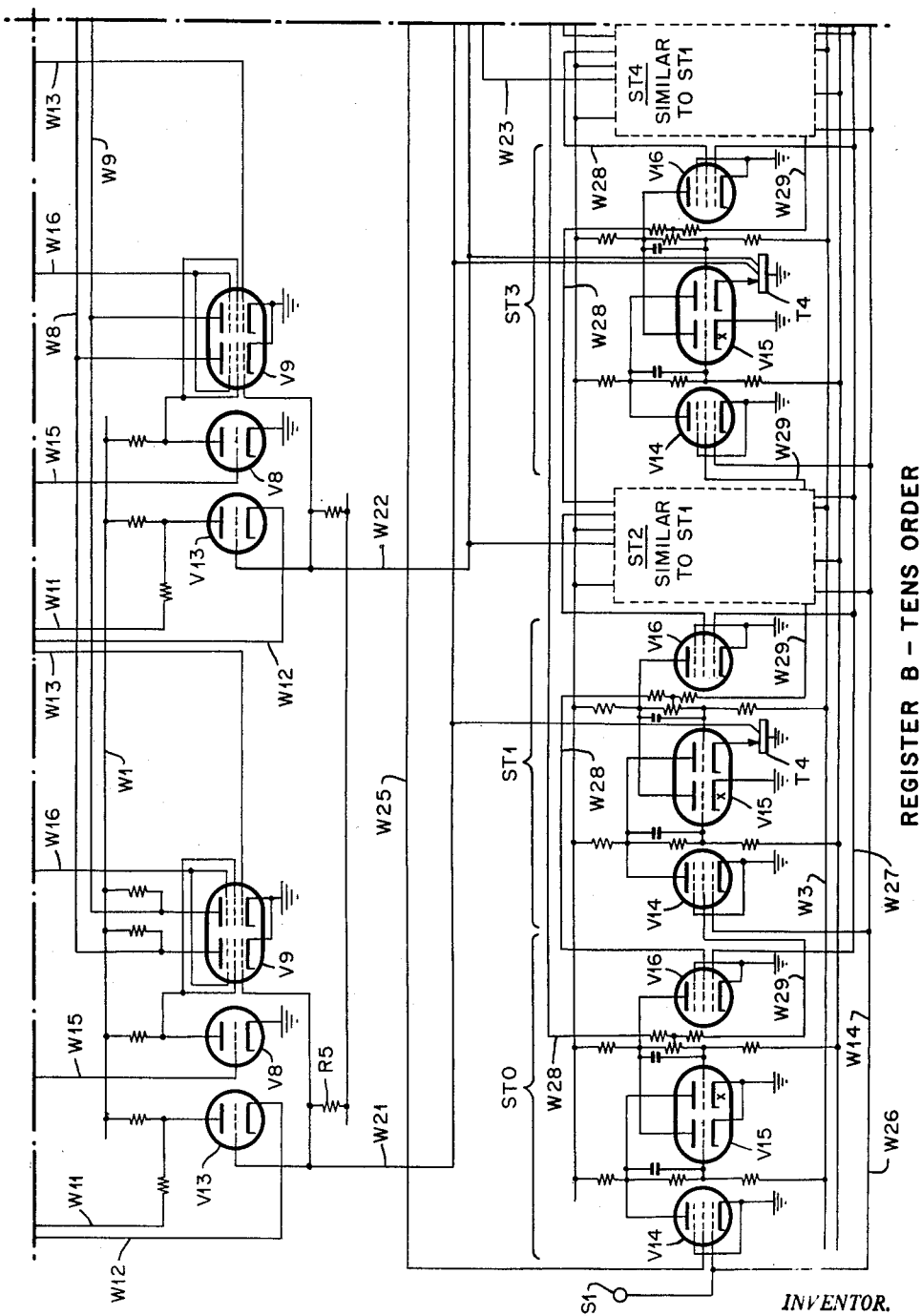

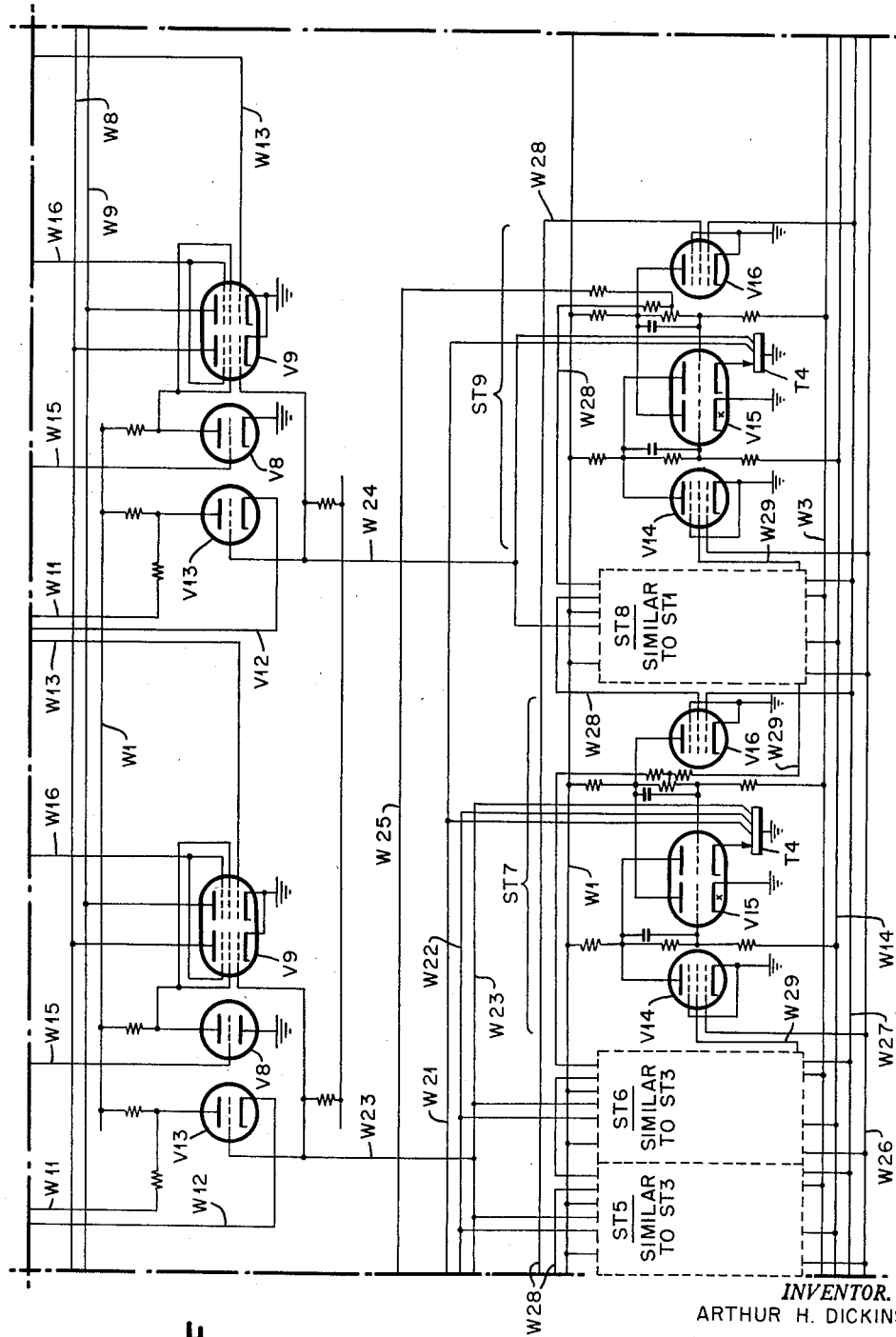

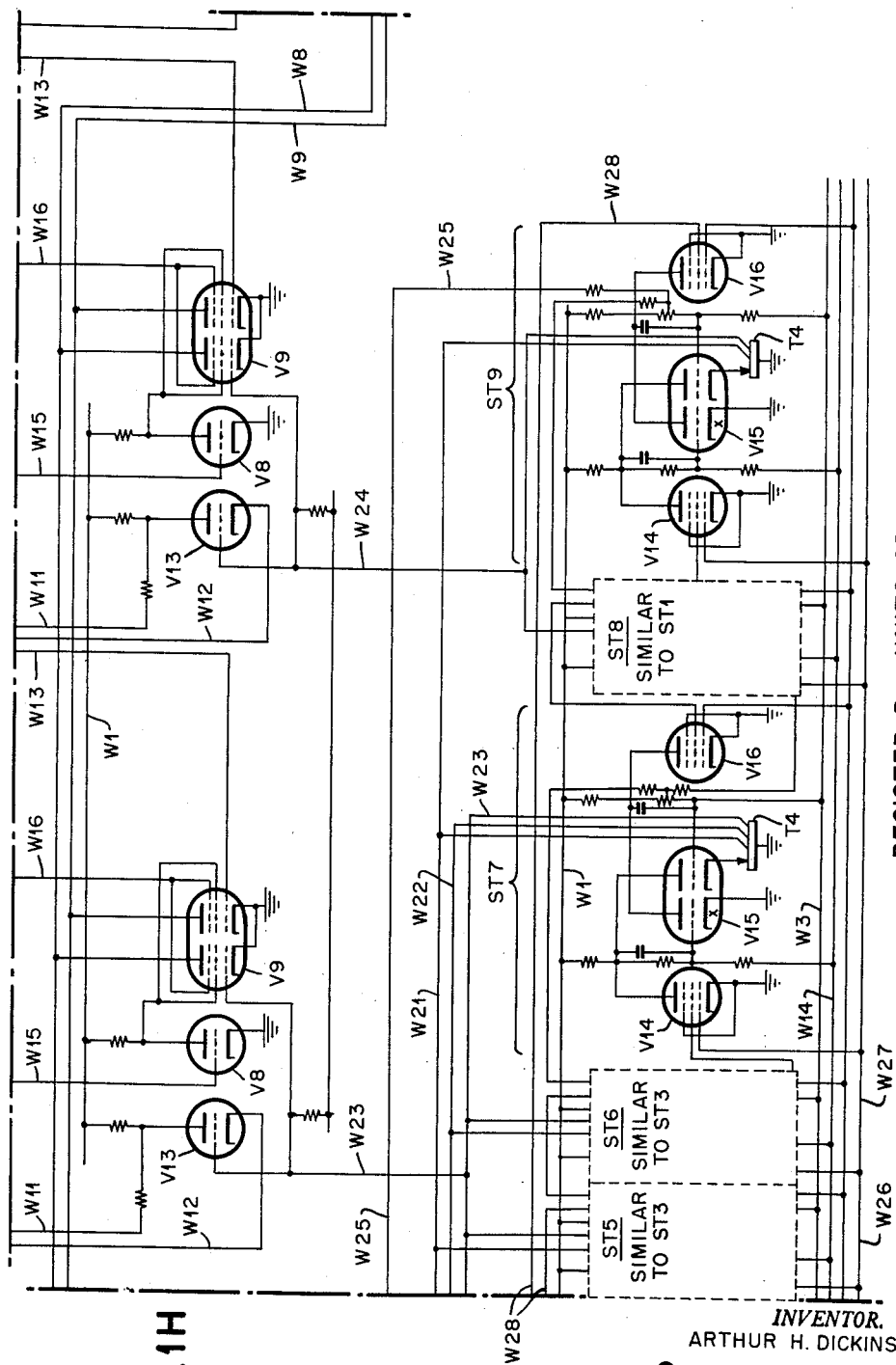

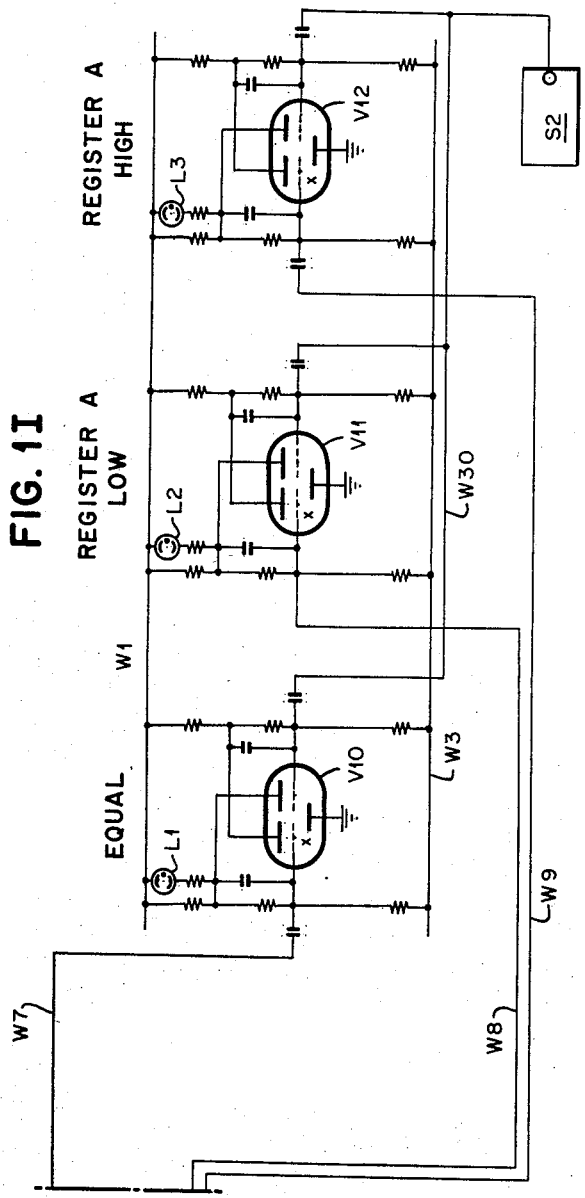

Jan. 26, 1960      A. H. DICKINSON      2,922,983
DATA PROCESSING MACHINE
Filed Dec. 31, 1954      10 Sheets-Sheet 10

INVENTOR.
ARTHUR H. DICKINSON
BY
ATTORNEY

United States Patent Office 2,922,983
Patented Jan. 26, 1960

2,922,983
DATA PROCESSING MACHINE

Arthur H. Dickinson, Greenwich, Conn., assignor to International Business Machines Corporation, New York, N.Y., a corporation of New York Application December 31, 1954, Serial No. 479,199

6 Claims. (Cl. 340—149)

This invention relates to machines for processing data and more particularly to means for determining the relative magnitude of data.

The principal object of the invention is to provide a means of determining the relative magnitude of data, in which the data is stored or represented in a plurality of different forms of representation.

An object is to provide a data comparing means in which the data is represented according to a plurality of different systems of representation, for example, to compare data in a binary form with data in a decimal system of representation in which a different individual element or device represents a single digit.

An object is to provide an electronic comparing circuit of the nature specified in the foregoing objects.

An object is to provide an electronic comparing circuit of the foregoing nature wherein semiconductor translating devices are used for the principal elements of the comparing circuits.

Other objects of the invention will be pointed out in the following description and claims and illustrated in the accompanying drawings, which disclose, by way of example, the principle of the invention and the best mode, which has been contemplated, of applying that principle.

In the drawings:

Figs. 1A to 1I form a wiring diagram of an electronic comparing circuit embodying the present invention.

Figure 1G:
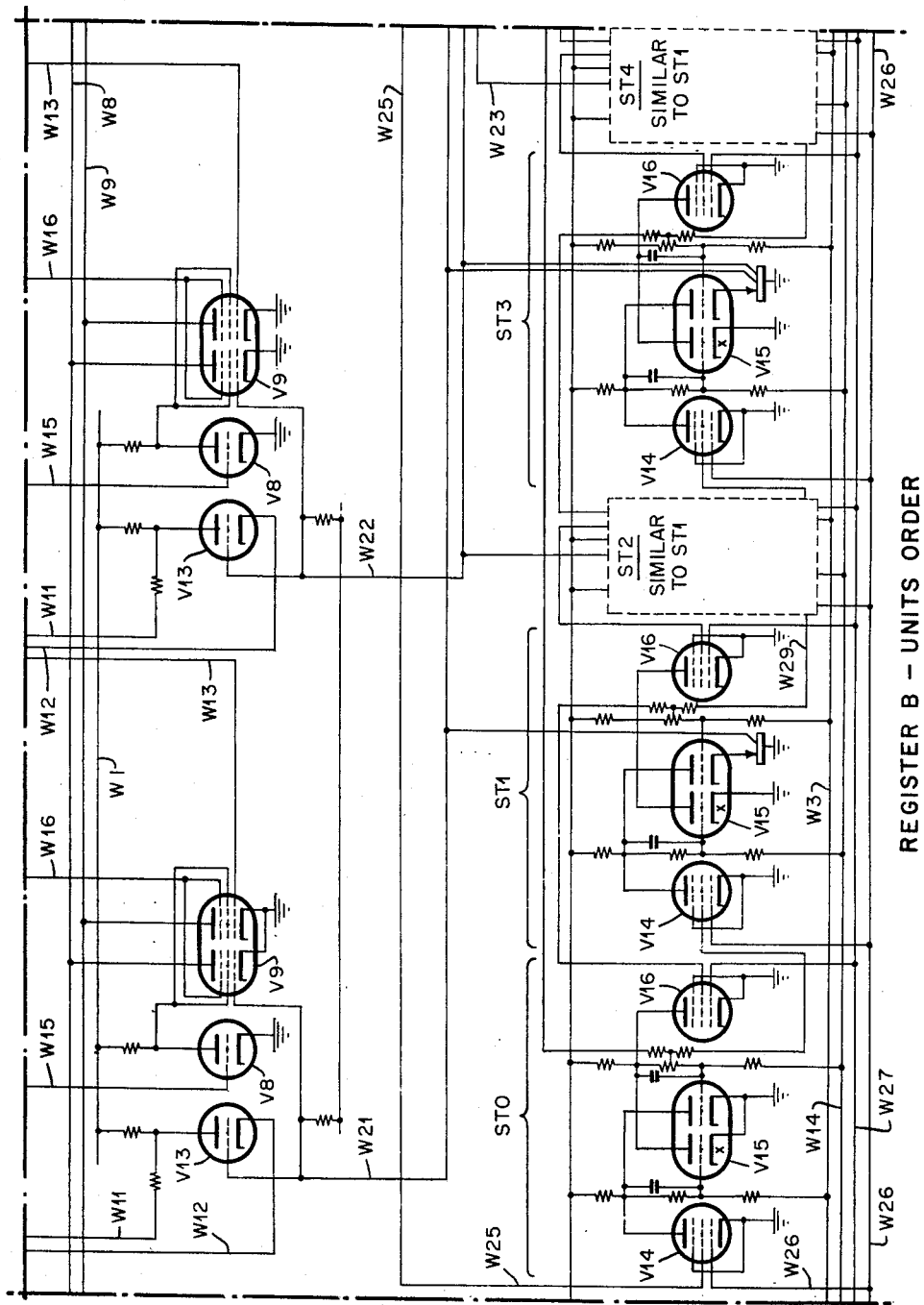
Figure 2:
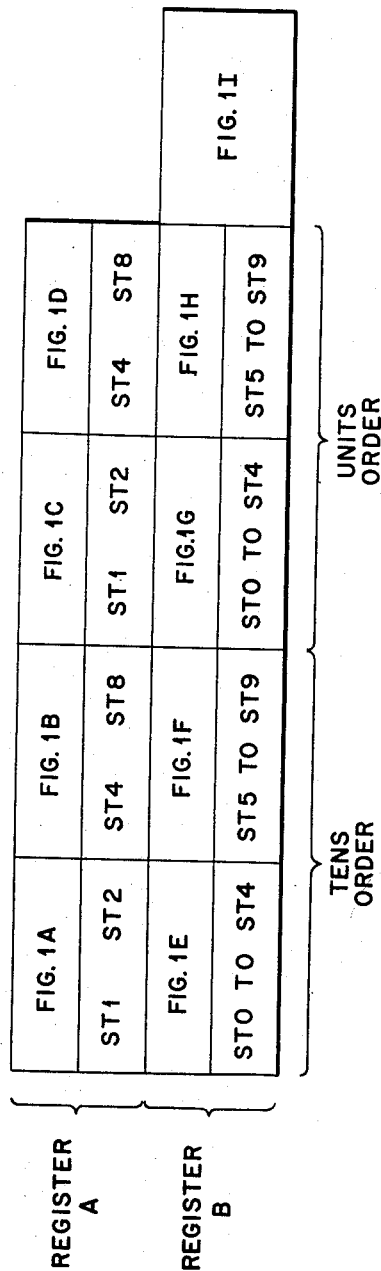

Fig. 2 is a diagram showing the arrangement of the individual Figures 1A to 1I to form a complete circuit diagram.

According to the present invention, there is provided a means for comparing data which is represented in at least two different forms to determine the sequential relationship or relative magnitude between the two forms of data. For purposes of illustrating the invention, there are disclosed in the drawings two registers. One, register A, stores data in the binary form, while the other, register B, stores the data in a form in which a series of elements are individually allocated to the respective digits of a number system and each digit is represented by a change of state of a single element. Typically, register B is arranged to store data according to a decimal digit form.

The registers, however, may be of other forms. For example, register A might be a quinary register, since the arrangement of the comparing circuit does not depend upon the precise nature of the register but only upon the fact that there exist in the register one or more differences of potential which indicate the existence of values in the designating elements of the register.

Illustratively, register A may be of the form disclosed in Patent 2,584,811 in which four trigger stages are provided for each denominational order for representing digits according to the binary bit values 1, 2, 4, 8 by the "Off" and "On" status of the triggers allocated to such bit values. Register B may be of the general form disclosed in Patent 2,580,741 in which each order consists of a form of ring circuit wherein each separate digital value is represented by the status of an individual trigger allocated to representing that value by its "Off" and "On" status. In the last-named case there are provided ten triggers for representing all of the digits from "0" to "9." It will be understood that the registers may consist of either simple storage devices or the respective orders may be intercoupled by means of suitable tens carry circuits of any well-known form.

Register A will not be described in detail because it is of conventional form and well known. A very brief description, however, will be given of register B because, while the principle of operation and circuit arrangement is substantially the same as in Patent 2,580,741, the wiring of the stages is slightly different due to the use of separate gates in place of the pentodes which serve the dual purpose of acting as gates and as half of the tube complement for the triggers in the last-named patent.

A typical stage for register B is stage ST0 which represents the digit "0," there being provided ten stages ST0 to ST9 (Figs. 1E and 1F) associated with the tens order of register B. Each stage consists of the tubes V14, V15, V16 of which the trigger tube V15 is wired as a conventional Eccles-Jordan trigger with the left-hand triode normally conductive when the trigger is in "Off" or non-digit-representing status, except for the stage ST0 wherein the right-hand triode is normally conductive to indicate the fact that the register stands at "0." The "Off" state is designated by a small "x" underneath the proper cathode of tube V15. Register B is operated by trains of positive pulses which by their number represent the digits "0" to "9" and these pulses may be applied to the plug socket PS1 in any of the usual ways known in the art, as by means of suitable "read-in" triggers and gates.

Let it be assumed for the moment that the value "1" is to be entered and that a b-phase positive digit entry pulse is applied through the plug socket PS1 (Fig. 1E) to wire W26 which is common to all of the control grids of the gate tubes V14 for a single order. The single pulse applied to the control grid of gate tube V14 for stage ST0 has no effect as this stage is "Off" but gate V14 for stage ST1 is off and its screen grid is at high potential owing to its connection to the right side of trigger V15 and the pulse on wire W26 causes gate V14 to conduct. This will change trigger tube V15 for stage ST1 to "On" status by driving the left-hand grid thereof negative and pulling down the anode potential of the right-hand triode.

Positive pulses (a-phase) normally appear on wire W27 which, as explained in Patent 2,580,741, are timed to occur between the positive entry b-phase pulses on wire W26 so that the single entry pulse on wire W26 that affected stage ST1 is followed immediately by a positive pulse on wire W27 which is applied to the control grids of all of the tubes V16. As a consequence of the change of status of the trigger V15 for stage ST1, a positive pulse is produced on the wire W28 owing to the sudden rise in potential of the left hand anode of this trigger which, in conjunction with the pulse appearing on wire W27, causes the gate tube V16 for stage ST0 to conduct. This drives the right-hand grid of tube V15 for stage ST0 negative and the latter is triggered to "On" status. All of the remaining triggers for stages ST2 to ST9 remain in "Off" status.

The entry pulses which appear on wires W26 can affect any given tube V14 only if the next adjacent trigger V15 on the right in Figs. 1E to 1G is in "On" status. It will be recalled that the anode of the left-hand triode of trigger tube V15 for stage ST0 initially was at high potential, thereby maintaining the screen grid of gate tube V14 for stage ST1 at high potential whereby the gate tube V14 for stage ST1 is conditioned for conduction when the first adding pulse was applied thereto as described above. Similarly, when stage ST1 assumes "On" status, the gate tube V14 for stage ST2 will be conditioned for conduction through the wire W29 so that the appearance of a second pulse on wire W26 can only affect the stage ST2. Thus, if another pulse which may be representative of the value "1" or may be the second of a series representing some digit other than "1" is now applied to wire W27, stage ST2 and, in the latter case successive stages ST3 to ST9, the subsequent stages will be progressively changed to "On" status to represent whatever digit corresponds to the number of pulses entered. For example, if the value "4" were entered, four pulses will cause the stages ST1 to ST4 to be triggered "On" and "Off" progressively leaving stage ST4 in "On" status and all other "Off" except stage ST0. Each time one of the stages goes "On," it turns "Off" the preceding lower valued stage through the wire connection W28 and primes gate V14 for the succeeding higher valued stage through wire W29. It will be seen that any given value will be represented by the "On" status of one of the stages ST1 to ST9 by the fact that the right-hand tube V15 in the stage is conductive.

In the case of register A (Figs. 1A to 1D), the binary bit values 1, 2, 4, 8 are represented by the "On" status, with the righ-hand triode conductive (Figs. 1A and 1B, for example), of stages ST1, ST2, ST4, ST8 in which the suffixes indicate the bit values.

For the purpose of comparing a value designated in register A by one or more of the bit values 1, 2, 4, 8 with a value represented by a single representation in register B in which the status of a single trigger represents a single digit, there is provided a series of groups of tubes designated V2 to V6 and the transistors T2, T3, T4. Certain of the transistors T4 are of the single collector type while others have a plurality of collectors, the maximum being three collectors in the case of stage ST7. Certain of the stages for register B are wired identically with the same number of collectors. For example, stages ST2, ST4, ST8 are identical with stage ST1 and have single collector transistors T4.

When a stage is in "On" status, current will be flowing in the emitter-base circuit of the related transistor causing its collector circuit to conduct at a maximum. For example, let it be assumed that the value "1" is entered in the tens order of register A which would be represented by the fact that the stage ST1 (Fig. 1A) is in "On" status. This causes maximum current conduction in the emitter circuit for transistor T2 and minimum current conduction in the emitter circuit of transistor T3. As a result a large voltage drop will be produced across the left-hand resistor R3 and a minimum voltage drop across the left-hand resistor R4. This will cause the tube V2 to conduct, but the tube V4 will be held nonconductive; thus, the right-hand half of the tube V3 will be conductive and the left-hand half nonconductive.

Now let it be assumed that the stage ST1 for register B likewise is in "On" status, the condition in which the values to be compared are equal. Transistor T4 for stage ST1 (Fig. 1E) will also be conducting a maximum in its emitter and collector circuits, thereby producing a large voltage drop in the resistor R5 which appears on wire W21. This will condition the tubes V9, V13 for conduction by making their control grids more positive. Since tube V3 is conditioned for conduction, current will flow through the resistor R4 for stage ST1 (Fig. 1A) thereby causing the tube V4 to conduct notwithstanding the fact that transistor T3 for stage ST1 in nonconductive. As a result the right-hand half of tube V3 will also be cut off and the anode potentials of tube V3 will be high and condition the gate tube V5 for conduction.

The remaining stages of the tens order of register A are assumed, for the time being, to be "Off." Take stage ST2 (Fig. 1A), for example. In this case, the left-hand side of triode V1 is conductive and the maximum emitter current will flow through transistor T3 for this stage, thereby producing a large voltage drop across right-hand resistor R4 causing tube V4 to conduct, thus cutting off the right-hand triode of tube V3. Assuming, for the moment, that all of the remaining stages ST0 and ST3 to ST9 of register B are "Off," there will be no current flow through the related transistors T4 and the wires W22, W23, W24 will be conducting minimum current, keeping the control grids of tubes V9, V13 at cut-off potential. The anode potentials of these tubes will remain high and cause current flow from the anodes over wires W11 through the resistors R4 (Figs. 1A and 1B) for stages ST2, ST4, ST8. As a result all of the tubes V3 for the tens order will be conductive, priming for conduction the four gate tubes V5 for this order at their suppressor grids.

With reference to Fig. 1B, a positive comparison testing pulse from a suitable source S is injected over wire W16 on the control grid of the gate tube V5 for the stage ST8 of the tens order. Since this tube is primed for conduction at its suppressor grid by the action just described, tube V5 will conduct and produce a negative pulse which will momentarily cut off inverter tube V6 for stage ST8. This produces a positive pulse on wire W20 which causes tube V5 for stage ST4 to conduct and produce a positive pulse through inverter tube V6 on wire W20 leading to sage ST2. Tube V5 of stage ST2 also conducts in like fashion and produces a positive pulse on wire W20 (Fig. 1A) which causes tube V5 for stage ST1 to conduct. This causes tube V6 of stage ST1 to conduct and produces a positive pulse on wire W18 which is transmitted to the tube V5 associated with stage ST8 for the units order in Fig. 1D for testing the units order stages ST8, ST4, ST2, ST1 in the same fashion and in the order named for equality in that order.

If the units order stands at "0," then the action just described will be repeated and a succession of positive pulses will be transmitted to the left from Fig. 1D to Fig. 1C causing tube V5 for stage ST1 (Fig. 1C) to conduct. This produces a negative pulse on wire W7 which is applied to the left-hand grid of the equal trigger V10 (Fig. 1I) changing it to "On" status and causing the "equal" indicator lamp L1 to become illuminated. The control triggers V10, V11, V12 are normally reset to conduct in "Off" status on the left-hand sides thereof by a negative pulse applied over wire W30 from a suitable source S2 timed to occur prior to the application of the test pulse from source "S." The triggers V10, V11, V12 through suitable auxiliary circuits may be used to control other apparatus in various known ways according to the type of machine or circuit in which the comparison is found to be useful.

The description so far has dealt with the most simple cases that could be conceived where registers A and B are either at "0" in respect to some stages or represent equality by the retention of a simple value such as unity. When the values stored in the registers are not equal, it is necessary to determine which register has the higher value. This function is controlled by the tubes V8, V9 which are controlled by the status of the value-representing stages in the registers. Since the status of the highest order in which an inequality exists determines the relationship between the numbers compared, it will be convenient to take a simple case in which the value "3" is stored in the tens orders of register A and "1" in register B.

In this case, in the tens orders, stages ST1 for both registers (Figs. 1A and 1E) and stage ST2 for register A (Fig. 1A) will be "On." Thus the transistors T2 for register A in Fig. 1A will both be conductive and, as before, transistor T4 of stage ST1 in Fig. 1E will be conductive. The left-hand tubes V9, V13 (Fig. 1E) will both be conductive, since wire W21 is now at high potential, thereby causing the tube V4 to conduct which will cut off the right-hand triode V3 for stage ST1. The tube V2 also will be conductive, since the transistor T2 of stage ST1 is conducting a maximum and tube V3 in this case will be cut off priming the left-hand gate tube V5 for stage ST1.

In the case of stage ST2, the right-hand transistor T2 is conductive, causing tube V2 to conduct. However, in this case tube V4 (Fig. 1A) is not conductive, since transistor T3 is not conductive and the right-hand tubes V9, V13 are not conditioned for conduction arising from the fact that the remaining stages ST2 to ST9 of register B are in "Off" status and none of the transistors T4 thereof are conductive so that the wire W22 remains at low potential. Thus tube V5 for stage ST2 of register A in Fig. 1A will not be primed for conduction because its suppressor grid will be held at a low potential. As a result the positive test pulse discussed above, which would normally cause right-hand gate tube V5 for stage ST2 (Fig. 1A) to conduct, has no effect and the equality control pulses to trigger V10 over wires W18, W20, W7 cannot take place. Since stage ST2 is in "On" status, the right-hand wire W13 (Fig. 1A) is held at a high potential thereby priming the right-hand pentode of gate tube V9 (Fig. 1E) for conduction at the control grid.

The equal pulse which appeared on the control grid of gate tube V5 of stage ST2 is transmitted over wire W16 to the suppressor grid of the right-hand pentode of tube V9. Since the right gate tube V5 is being held non-conductive with its suppressor grid at low potential, right-hand wire W15 is likewise at low potential cutting off tube V8 (Fig. 1E) and its high anode potential primes the right-hand pentode of gate tube V9 for conduction at the screen grid. Thus the positive pulse appearing on wire W16 causes momentary conduction of the right-hand pentode of gate tube V9 and produces a negative pulse on wire W9. As will be seen in Fig. 1I this will change trigger V12 to "On" status and illuminate the lamp L3 which indicates that register A is high. This action will take place regardless of the status of the units order because the test pulse is injected at stage ST8 of the highest order and can never get any further than the first gate tube V5 at the right which is maintained in non-conductive status by the comparison control tubes V2, V3, V4 for stage ST2.

Now let it be assumed that the relation of the values is reversed and that register B retains the value "7" and register A the value "3" in the tens orders. The value "3" is represented in register A by the fact that stages ST1, ST2, are in "On" status and the value "7" is stored in register B by stage ST7 being in "On" status. Thus, the transistors T2 for stages ST1, ST2 of register A (Fig. 1A) and transistor T4 for stage ST7 of register B (Fig. 1F) are fully conductive in the collector circuits, placing the wires W21, W22, W23 at an elevated potential and causing the tubes V2 for these stages (Figs. 1A and 1B) to be rendered conductive by the tubes V13 in Fig. 1E. All of the tubes V9, except the one on the right in Fig. 1F, will be primed for conduction at the control grid in the same manner described in the first example since wires W21, W22, W23 are at high potential.

So far as the stages ST1, ST2 in Fig. 1A are concerned, the same equality condition which was discussed above will be created. Both tubes V5 in Fig. 1A will be primed for conduction. However, the equal test pulse which would normally appear on wires W20 and be transmitted over wire W18 to the units order will be prevented from appearing due to the fact that stage ST4 is "Off" and only the left-hand tube V4 is conductive in Fig. 1B. Tube V2 will not be conductive, since the stage ST4 is "Off" and the transistor T2 is conducting at its minimum, thus maintaining the grid of tube V2 at a potential below cutoff. Thus tube V5 corresponding to stage ST4 is not primed for conduction.

The same action will take place with respect to the tube V9 corresponding to stage ST4 in Fig. 1F as was previously described except that the left-hand half of tube V9 now will be rendered conductive due to the fact that wire W23 is at an elevated potential. Thus the equal impulse appearing on the wire W16 of the gate tube V5 of stage ST4 will produce a negative pulse on the anode of the left-hand pentode of gate tube V9 (Fig. 1F) which pulse will be transmitted over wire W8 to change the trigger V11 to "On" status and illuminate the light L2 which indicates that register A is low, or, conversely, that register B is high.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In an electronic data processing machine, a pair of electronic registers, one comprising a binary decimal register having a plurality of orders, each composed of a series of trigger stages representing by different stable states the bit values of a binary system of numbers, the other register comprising a plurality of decimal ring circuits, one for each order, each ring circuit being composed of a series of decimal trigger circuits, each trigger circuit representing by a predetermined stable state a single digit, each ring circuit having means to sequentially pulse said trigger circuits to effect entries of digits in said rings; a series of equal gates each corresponding to one of the trigger circuits of said binary register, each gate representing the bit value of the associated trigger circuit; a series of pairs of control circuits; one pair for each gate and the related trigger circuit, each circuit including a semiconductor responsive to one of the stable states of the related trigger circuit of the binary register, a plurality of series of bit value circuits, one series for each of said ring circuits, each circuit representing a binary bit; a plurality of series of multicollector semiconductor translating devices, each series being associated with a decimal ring circuit, each translating device being rendered conductive when one of said decimal triggers is in the predetermined stable state, the collectors of each series of devices being connected in common by the bit value circuits according to the need for bit values in representing the digits of the decimal system.

2. In electronic data processing machine, a decimal register, each order comprising a series of electronic digital circuits, each conditionable to represent one of the digits 0 to 9 by a potential difference, a second register comprising a series of first component value circuits, each conditionable to represent one of a series of components which taken singly or in combination may represent said digits, each component value circuit being conditionable to represent the related component value by a potential difference; a plurality of second component value circuits for each order of the decimal register, coupling circuits connecting each component value circuit for a given value to the digital circuits of same value and those digital circuits representing digits of which such given value is a component; a plurality of pairs of resistive loads, each pair corresponding to one of said first and second component value circuits, respectively, electronic means to couple said resistive loads to said component value circuits and operative to cause like potential changes to appear across each pair of loads when both register designate the same values in corresponding orders; coincidence circuits individual to and connecting said pairs of loads, and an equal circuits including a series of electronic switches in cascade, each switch being rendered operative by one of said coincidence circuits, when like potential changes occur across a related pair of resistive loads.

3. The invention set forth in claim 2 in which the coupling circuits include semiconductor translating devices.

4. In a electronic data processing machine, a pair of registers, one for representing numbers in the decimal system, each order having a series of digital circuits representing the digits 0 to 9 by predetermined potentials at selected points in each circuit, the second register having a series of circuits representing the component values of a nondecimal system by predetermined potentials at selected points in the circuits of the second register, said component value circuits being different in number from the digital circuits; a series of pairs of loads, at least one pair for each component value; a series of phase inverters, each having its output connected to a pair of said loads, means to couple said component value circuits to the loads associated with said component value circuits, means to couple the digital circuits of the first register which represent each component value or which contain the component value to the inverters corresponding to said component values, coincidence circuits interconnecting said loads, and equal switching means responding to all of said coincidence circuits when both registers contain the same values.

5. The invention set forth in claim 4 in which at least one additional switching means rendered operative by said groups of digital circuits and by said coincidence circuits for denoting the fact that the decimal register has the higher value.

6. The invention set forth in claim 4 in which at least one additional switching means rendered operative by the predetermined potential of the component value circuits and by said coincidence circuits for denoting the fact that the second register has the higher value.

References Cited in the file of this patent

UNITED STATES PATENTS

| | | |
|---|---|---|
| 2,565,511 | McWhirter et al. | Aug. 28, 1951 |
| 2,693,593 | Crosman | Nov. 2, 1954 |
| 2,700,755 | Burkhart | Jan. 25, 1955 |
| 2,712,898 | Knutsen | July 12, 1955 |
| 2,763,854 | Oliwa | Sept. 18, 1956 |
| 2,776,418 | Townsend | Jan. 1, 1957 |
| 2,784,396 | Kaiser et al. | Mar. 5, 1957 |
| 2,785,388 | McWhirter et al. | Mar. 12, 1957 |

OTHER REFERENCES

Publication: Proceedings of IRE, February 1949, pages 139–147, Rectifier Networks for Multiposition Switching, by Brown and Rochester.